United States Patent
Nussbaumer et al.

(10) Patent No.: US 7,613,575 B2
(45) Date of Patent: Nov. 3, 2009

(54) METHOD FOR PROCESSING THE OUTPUT SIGNAL OF A MEASUREMENT TRANSDUCER, AND FORCE-MEASURING DEVICE

(75) Inventors: Marc Nussbaumer, Zürich (CH); Daniel Reber, Madetswil (CH)

(73) Assignee: Mettler-Toledo AG, Greifensee (CH)

( * ) Notice: Subject to any disclaimer, the term of this patent is extended or adjusted under 35 U.S.C. 154(b) by 9 days.

(21) Appl. No.: 11/749,569

(22) Filed: May 16, 2007

(65) Prior Publication Data

US 2007/0271056 A1 Nov. 22, 2007

(30) Foreign Application Priority Data

May 22, 2006 (EP) .................................. 06114322

(51) Int. Cl.
- *G01L 1/00* (2006.01)
- *G01L 5/00* (2006.01)
- *G01G 23/01* (2006.01)
- *G06F 17/10* (2006.01)

(52) U.S. Cl. ........................... 702/41; 702/101; 73/765; 73/769; 73/771; 708/300; 177/25.13

(58) Field of Classification Search ................. 702/101, 702/41; 708/300; 177/25.13, 25.12; 73/771, 73/765, 769
See application file for complete search history.

(56) References Cited

U.S. PATENT DOCUMENTS

| | | | |
|---|---|---|---|
| 4,365,680 A * | 12/1982 | Gottstein et al. ............ | 177/212 |
| 4,860,839 A | 8/1989 | Reichmuth | |
| 4,977,526 A | 12/1990 | Jost et al. | |
| 5,665,941 A | 9/1997 | Wehhofer et al. | |
| 5,960,391 A | 9/1999 | Tateishi et al. | |
| 6,271,484 B1 | 8/2001 | Tokutsu | |
| 6,657,138 B2 | 12/2003 | Klauer et al. | |
| 6,774,319 B2 * | 8/2004 | Aoki et al. .................. | 177/144 |
| 6,857,002 B1 | 2/2005 | Thomsen et al. | |
| 6,956,175 B1 * | 10/2005 | Daly et al. ..................... | 177/1 |
| 7,177,889 B2 | 2/2007 | Chatterjee | |
| 2003/0200241 A1 | 10/2003 | Liang et al. | |
| 2004/0088342 A1 | 5/2004 | Aikawa et al. | |

* cited by examiner

*Primary Examiner*—Eliseo Ramos Feliciano
*Assistant Examiner*—Janet L Suglo
(74) *Attorney, Agent, or Firm*—Standley Law Group LLP

(57) ABSTRACT

The output signal from a measuring transducer in a force-measuring device is processed by filtering a measuring signal (ms), representing a load that is acting on the transducer, to suppress interfering signal portions caused by extraneous influences including mechanical disturbances, or changes of the load. The measuring signal ($ms_E$) passes through a first delay element (141A) to a measurement value unit (145) which holds the value of the currently received measuring signal ($ms_E$), a mean value based on the most recent values of the measuring signal, or an expected value ($ms_E$) based on the most recent values of the measuring signal. The measuring signal ($ms_E$) is monitored for signal disturbances using a first detector module (151). After detection, a switching means (142) is actuated and the output signal ($ms_X$) of the measurement value unit is processed further, if applicable, and sent to the output end of the device, instead of the currently received measuring signal ($ms_E$).

18 Claims, 5 Drawing Sheets

METHOD FOR PROCESSING THE OUTPUT SIGNAL OF A MEASUREMENT TRANSDUCER, AND FORCE-MEASURING DEVICE

CROSS-REFERENCE TO RELATED APPLICATIONS

This application claims a right of priority under 35 USC §119 from European patent application 06114322.8, filed 22 May 2006, the content of which is incorporated by reference as if fully recited herein.

TECHNICAL FIELD

The invention relates to a method for processing the output signal of a measurement transducer, and it also relates to a force-measuring device, in particular a balance, that operates according to the inventive method.

BACKGROUND OF THE ART

The measuring accuracy of a force-measuring device, in particular a balance based on electromagnetic force compensation or on strain gauge technology, is influenced by numerous factors. Mettler-Toledo GmbH publication "Bauen Sie Ihre Qualität auf solidem Grund!", January 2001, pp. 14-15 describes such technology and the influencing factors are described in "Wägefibel", another Mettler-Toledo GmbH publication dated April 2001. Extraneous mechanical influences such as vibrations or shocks are particularly detrimental, which is the reason why filters for the removal of interfering signal components were provided already in balances with analog signal processing.

A balance, as disclosed in U.S. Pat. No. 4,860,839 to Reichmuth, uses an active low-pass filter that serves to suppress interference signals in the form of interfering alternating currents that are superimposed on the DC signal which is produced by the weighing cell and transmitted through a signal line to an analog/digital converter. The interference signals are separated out of the signal line at the signal output terminal of the weighing cell and, after a 180° phase shift by an inverter, they are returned to the signal line at the signal input terminal of the analog/digital converter, while the signal line itself between the branching-out and rejoining nodes contains only an ohmic resistance (i.e. a non-phase-shifting resistance). Consequently, the interference signals are canceled by signal components of corresponding amplitude but opposite phase.

U.S. Pat. No. 6,657,138, to Klauer, describes an electronic weighing transducer with a digital signal-processing unit wherein the DC signal component is determined from the output signal of the weighing transducer by means of a filter with a low-pass characteristic and wherein the weighing result is derived from the DC signal component. At the same time, a shock/vibration-dependent signal is determined, and the DC component of the measuring signal is modified dependent on the shock/vibration-dependent signal. This solution avoids drawbacks that occur in the solution disclosed in U.S. Pat. No. 5,665,941, to Wehhofer.

In Wehhofer '941, the time constant of the low-pass filter in a differential dosage-weighing balance is adapted depending on the interference signal. When large interfering disturbances are present, the time constant of the low-pass filter is made longer in order to achieve a stronger filtering effect. However, Klauer '138 indicates that this slows down the response of the weighing transducer to step changes of the weight while it improves the reproducibility of the measurements only to an insignificant extent. In addition, if the time constant is selected too large, this has the result of a long settling time with changes of the weighing load.

Further methods as well as balances suited for the use of the respective methods are described in United States published application 2004/0088342 to Aikawa and U.S. Pat. No. 6,271, 484 B1 to Tokutsu, where signals produced by the measurement transducer are processed by means of variable digital filters.

The method described reference Aikawa '342 allows the characteristics of the filter that is used in a measuring system to be individually adapted to the oscillatory properties of the measuring system that is being controlled. The damping of the filter can therefore be increased as much as desired in a selected frequency range.

According to the method described in reference Tokutsu '484, a test is made whether the amplitude of the signal disturbances caused by vibrations lies within a permissible range. If this is not the case, the filter characteristic is changed until the signal disturbances fall into the permissible range again.

The last-described method in particular requires a high-volume computing effort and, due to the time constant of the regulation feedback loop, hardly permits a sufficiently fast adaptation to rapid changes of the amplitude of vibrations and oscillatory disturbances when they occur.

Of particular importance are the effects that load changes cause in the weighing system. A step change of the weighing load is followed by high-amplitude oscillations with a relatively fast decay. The objective for the filter device incorporated in the balance is to obtain the best possible damping of the oscillations that follow a step change of the weighing load and to simultaneously achieve a short settling time of the weighing system. A filter arrangement suitable for this purpose is shown in FIG. 1. With this device, the measuring signal is monitored in regard to a step change of the weighing load. After a step change has been detected, at least one filter parameter of the filter is reset and changed in accordance with a specific time profile, preferably in the form of an exponential function, so that the filter is opened after the load change has been detected and then closed again up to a given filter characteristic which is determined by the end value of the at least one filter parameter. Filter arrangements of this kind are realized preferably with digital filters.

Basic structures of digital filters are described in the book by U. Tietze and Ch. Schenk, entitled "Halbleiterschaltungstechnik" ("Semiconductor Circuit Design"), $11^{th}$ Edition, $2^{nd}$ Printing, Springer Verlag, Berlin 1999, chapter 21.3. FIG. 21.15 (page 1145) shows a digital filter which has a delay chain with n delay elements. According to this text at page 1144, the input signal of the delay chain is the result of the input signal delivered for example by a measurement transducer and the sum of all weighted intermediate values that are derived from the outputs of the delay elements. Accordingly, the output signal is the weighted sum of all intermediate values.

This has the consequence that the input signal with all changes and superimposed additions remains preserved in the filter stage for a relatively long time. It would therefore be desirable if the processing within the analog or digital filter stage included in essence only signal components that have a direct connection to the object being measured and if other signal components were completely suppressed.

In the pursuit of this objective, the suppression of disturbances in a force-measuring device is made more difficult by the fact that the useful signals that are caused for example by a change of the load and the disturbance signals that are caused for example by a mechanical shock or impact typically exhibit similar signal profiles, so that it is difficult to separate them from each other.

The embodiments disclosed herein have the objective to provide an improved method for the processing of the output signal of a measurement transducer, and to further provide a force-measuring device that operates in accordance with the disclosed method.

SUMMARY OF THE INVENTION

The aim is in particular to propose a method and a force-measuring device which on the one hand permit a reliable detection and suppression of disturbance signals which are caused in particular by mechanical shocks or impacts, and to ensure on the other hand that useful signals can pass along the signal-processing path with the least possible hindrance.

The method and the force-measuring device should further make it possible to completely remove the energy contributions of disturbance signals from the signal-processing path, so that the processing of the useful signals is not hampered by disturbance signals.

This task is solved by a method and a force-measuring device with the features described in the independent claims. Advantageous further developed embodiments are presented in the dependent claims.

The method serves for the processing of the output signal of a measurement transducer which is installed in a force-measuring device, in particular in a balance, and which produces a measuring signal representing a load acting on the transducer, wherein the measuring signal is filtered in an analog filter and/or—after processing in an analog/digital converter—in a digital filter, in order to suppress unwanted signal components that are caused by extraneous effects such as mechanical disturbances and step changes or gradual changes of the load.

According to the disclosed embodiments, the measuring signal is transmitted to a measurement value unit which delivers at its output terminals: the received and retained value of the measuring signal, or a mean value composed of the most recent values of the measuring signal that occurred within a given time interval, or an expected value of the measuring signal established on the basis of the most recent values of the measuring signal that occurred within a given time.

The measuring signal is now monitored for the occurrence of signal disturbances by means of a first detector module that is incorporated in a controller unit, wherein the detection of a signal disturbance causes switching means to be actuated in such a way that instead of the received measuring signal, the output signal of the measurement value unit is transmitted to the modules of the force-measuring device that follow downstream of the measurement value unit, for example a filter stage, a measurement processor or an indicator unit.

In a preferred embodiment, the delivery of the output signal at the output of the measurement value unit occurs with a delay. This can be realized with at least one first delay element placed upstream of the measurement value unit or with delays inside the measurement value unit. The delay inside the measurement value unit can be realized in a particularly simple manner through the processes that serve to establish the mean value or the expected value, or through an integrally incorporated delay element.

This delay has the result that a disturbance of the measuring signal does not yet appear at the output of the measurement value unit at the time when it is detected, and consequently a still undisturbed signal is transmitted from the measurement value unit to the downstream modules. Furthermore, a disturbance is particularly simple to recognize by comparing the current measuring signal with the delayed output signal of the measurement value unit.

The measures taken using the embodiments have the advantageous result that disturbances are not only filtered but are completely shut out and replaced by the output signal of the measurement value unit. Thus, the force-measuring device always gives the user the best possible measurement values, either based on the undisturbed measuring signal or, in case of a disturbance, based on an almost current previous or expected measurement value.

It is further of particular advantage that after the disturbances have been shut out in the way described, the downstream modules in the signal-processing path of the measuring device are not receiving any further significant disturbance signals that could harm the signal-processing.

Consequently, measurement errors caused by disturbances are on the one hand avoided, while on the other hand the signal-processing stages, in particular digital filters, are not subjected to appreciable amounts of energy contributed by signal disturbances, so that measuring signals can be processed faster and with higher precision.

The switching means provided for this purpose can be of a particularly simple design, if the measuring signal is directed by way of the first delay element and by way of a first adding stage where the output signal of the measurement value unit is subtracted from the measuring signal, and further through the switching means, to a second adding stage where the output signal of the measurement value unit is added again to the arriving signal. Thus, when the switching means are closed the second adding stage delivers the measuring signal as received, and when the switching means are open the second adding stage delivers the output signal of the measurement value unit and sends it downstream on the signal-processing path.

In a further preferred embodiment a second detector module which is incorporated in a controller unit is used to monitor the measuring signal for the occurrence of step changes of the load, and/or a third detector module is used to monitor the measuring signal for gradual changes of the load, whereupon if step changes and/or gradual changes have been detected, the switching means are actuated in such a way that the measuring signal passes through the switching means directly to their output connection.

The second and the third detector module thus serve to test the disturbances found by the first detector module, and if a step change or a gradual change of the load has been found, the measuring signal is given free passage by the switching means in order to allow the measuring system to follow the change as fast as possible. The term "step change" as used here means a major change in the magnitude of a load or even an exchange of one load against another. Gradual changes on the other hand are small changes of the kind that typically occur in dosage-dispensing processes.

When step changes and/or gradual changes of the load are detected, the filter parameters of the filter stages are preferably controlled in such a way that results in short settling phases with relatively small oscillation amplitudes. For example, at least one filter parameter of the filter is reset after a load change has been detected and changed according to a time function in accordance with a prescribed profile, preferably conforming to an exponential function, so that the filter is opened after the load change has been detected and then closed again up to a given filter characteristic which is determined by the end value of the at least one filter parameter.

With the preferably complete opening of the filter after detecting a step change, it becomes possible to rapidly follow the load changes. The subsequent closing of the filter to a prescribed filter characteristic achieves a practically optimal suppression of signal disturbances, in particular oscillations caused by the step change. The overall result is therefore a strongly shortened settling time after a step change. With a suitable choice of the end values of the filter parameter, one ensures in addition that the measuring signal is optimally filtered also after the settling phase of the measuring system.

In a further preferred embodiment, the measuring signal and the output signal of the measurement value unit—the latter signal with a delay in relation to the measuring signal produced by means of the first and/or a second delay element—are both directed inside the controller unit to an adding stage which produces a difference signal representing the difference between the two signals and which allows disturbances, step changes and gradual changes to be more easily registered.

To establish the presence of such changes and fluctuation, the difference signal, more specifically the absolute amount of the difference is compared to a fixed or variable threshold value in a first threshold value module inside the first detector module, in order to detect disturbances; and/or is compared to a fixed or variable threshold value in the second detector module, in order to detect step changes; and/or is evaluated in the third detector module in order to determine whether a gradual load change has occurred.

Preferably, the first detector module contains a statistic module by means of which the variance of the difference signal is calculated and the threshold value in the first threshold value module is set at a level depending on the variance. Thus a lower threshold value can be selected if normally only small signal changes occur. A signal change representing a disturbance can therefore be safely detected even at a relatively small amplitude without the risk of false detections. On the other hand, in order to avoid false detections when the variance of the input signal is relatively large, one will select an correspondingly higher trigger threshold.

In the third detector module, the difference signal is preferably introduced—either directly or by way of a signal limiter which limits the amplitude of the transmitted signal—into an integrator whose output signal is compared with regard to its absolute amount to at least one threshold value in a second threshold value module downstream of the integrator. Due to the integration of the difference signal, the third detector module can detect small load changes. In order to be able to detect small load changes quickly, a preferred procedure is to measure the time after a zero-crossing of the difference signal and to establish a corresponding time value which, after having been raised to a higher power, is used as a weighting factor by which the difference signal is multiplied before it is introduced into the integrator. This has the consequence that a very small but constant offset manifests itself rapidly due to the multiplication with the weighting factor which preferably grows as a higher-order function of time.

The integrator is in this case controlled in such a way that its output signal grows as long as the amount of the difference signal differs by a sufficient amount, and that it subsequently decreases again. Preferably, a second weighting factor is formed which equals 1 if the difference signal is clearly different from zero, and which equals an amount smaller than 1 if the difference signal is close to zero. The second weighting factor is for example introduced into a multiplier stage inside the integrator loop.

Preferably, the output signal of the integrator has to exceed a higher first threshold value before a load change is signaled and to subsequently fall back below a lower second threshold before the signal that indicates the load change is canceled again. This measure serves to prevent a situation where the third detector module no longer indicates the presence of a load change while the first detector module still treats the same load change as a disturbance.

It needs to be noted that after a load change has been signaled, the measuring signal is again switched into direct passing mode, whereby the output signal of the measurement value unit, and thus also the difference signal, is made to follow the load change.

In a further preferred embodiment, at least the measuring signal and/or the difference signal is introduced into a trained neural network which, when signal changes occur, makes a determination as to whether they were caused by a disturbance, by a step change and/or by a gradual change of the load, whereupon the filter parameters and/or the switching means are steered accordingly. Neural networks and methods of training them are known for example, in U.S. Pat. No. 5,960,391 to Tateishi.

The force-measuring device can be trained for example in a disturbance-free mode of operation where only small gradual load changes or larger step changes of the load are made. Thus, the neural network learns the behavior of the balance in different operating states and is thereby enabled to decide precisely whether a small gradual load change or a step change of the load or a disturbance has occurred. The balance can thus be trained individually by the user so that it adapts itself optimally to the local situation, to the configuration of the balance, to the individual way it is being handled by the user, and to the processes performed by the user.

The switching means are preferably designed so that the measuring signal presented at the input of the switching means is either directed to a first input of a changeover switch on a first signal path that is equipped with a switch and a limiter, or on a second signal path directly to a second input of the changeover switch. In the absence of extraneous influences such as disturbances, step changes of the load and gradual load changes, the switch controlled by the first detector module remains closed and the switch that is controlled by the second and/or third detector module remains switched to the first input, so that the measuring signal can travel from the input to the output of the switching means on the first signal path.

When a disturbance is detected by the first detector module, the latter opens the switch and interrupts the first signal path until the disturbance has settled down. The limiter prevents in this case that signal portions belonging to the disturbance pass through the switching module before the switch is opened. The switch preferably continues to remain in the open state for n clock cycles after no further signal disturbances have occurred.

When a step change or a gradual change of the load is detected by the second or third detector module, respectively, the detector modules cause the changeover switch to connect to the second input, so that the measuring signal can travel from the input to the output of the switching means along the second signal path and be processed further.

The switching means are preferably incorporated within a filter chain, as close as possible to the input end of the chain, so that disturbances are caught as early as possible and are completely removed. On the other hand, by placing a filter stage ahead of the chain, the measuring signal can be conditioned far enough to facilitate the processing of the signal.

BRIEF DESCRIPTION OF THE DRAWINGS

In the following, the embodiments are described in more detail with the help of drawings, wherein.

DETAILED DESCRIPTION OF A PREFERRED EMBODIMENT

Figure 1:
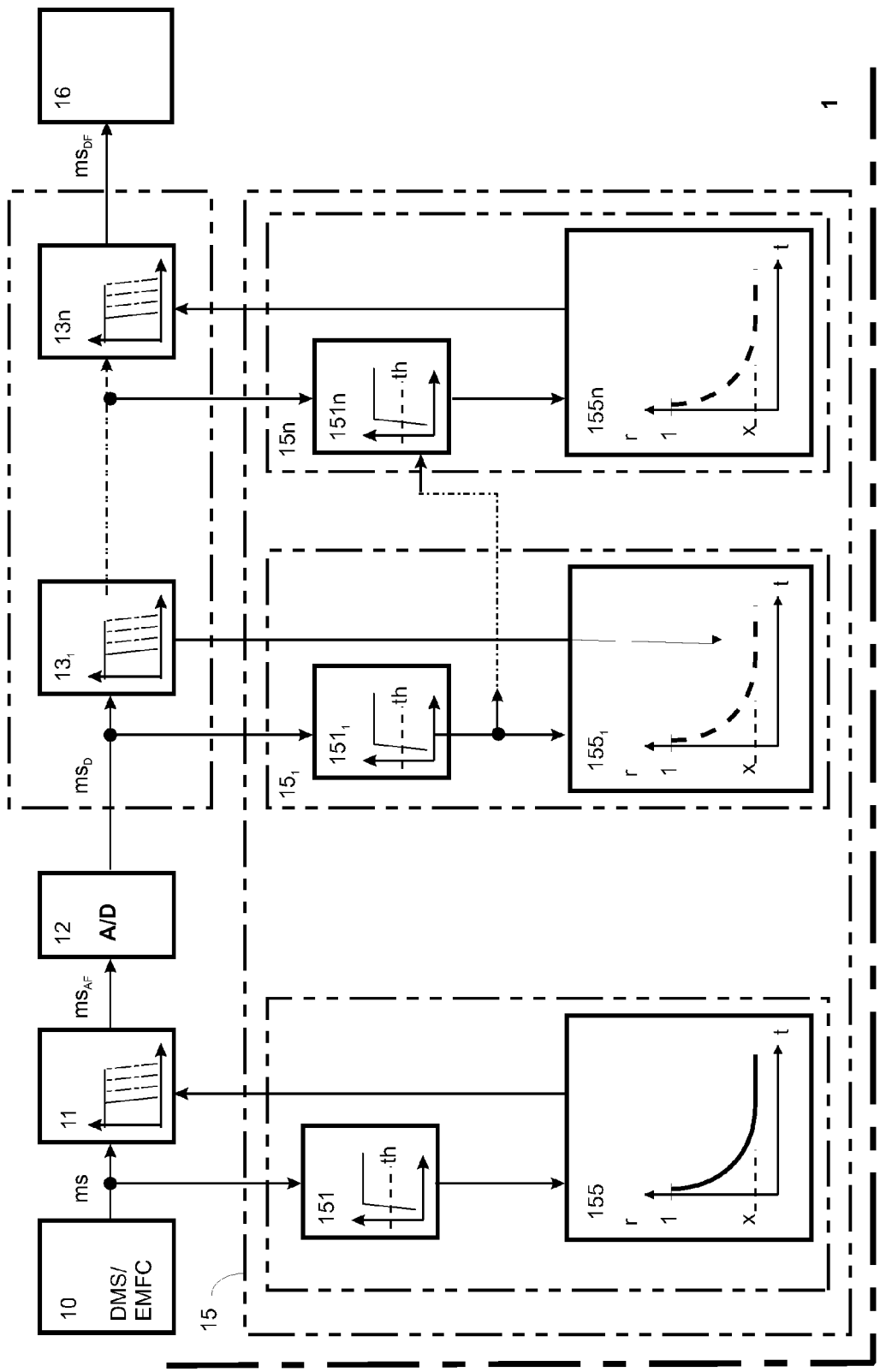
FIG. 1 shows the block diagram of a balance 1 which has a measurement transducer 10, a variable analog filter 11, an A/D converter 12, a chain of variable digital filters 131, ..., 13n, followed downstream by a signal-evaluating unit 16, for example a measurement processor.

FIG. 1 represents the block diagram of a balance 1 containing a measurement transducer 10 which delivers an analog measuring signal ms representing a weighing load through a variable analog filter 11 to an analog/digital converter 12. The digitized measuring signal $ms_D$ is passed on through a chain of variable digital filters 131, ..., 13n, from where the filtered digital measuring signal $ms_{DF}$ is sent to an output unit 16 which is preferably equipped with a processor and which puts out the measuring results, for example by displaying them on a readout screen.

The signals that are present at the inputs of the filter units 11, 13 are transmitted to threshold value modules 151, $151_1$, ... $151_n$ in a controller unit 15, wherein the threshold value modules detect the occurrence of load changes and actuate generator modules 155, $155_1$, ..., $155_n$ which, after a load change has been detected, reset a filter parameter r of a filter unit 11, $13_1$, ..., $13_n$ which is assigned to the respective generator module and then cause the filter parameter r to change as a function of time, converging towards a given end value x.

Accordingly, the circuit arrangement according to FIG. 1 allows analog and/or digital filters 11, 13 to be advantageously controlled, for example after a step change of the weighing load has occurred. In the analog signal-processing unit, it is advantageous to use active filters 11 with adjustable filter parameters as described in the Tietze and Schenk reference cited above, at chapter 13, pages 888 to 893. The electronic control of the filter parameters is described on page 891. In the digital signal-processing unit, digital filters 13 are used whose filter parameters are adjustable, as described in the same reference at chapter 21. Of course, the control of the filter parameters can be more easily realized with a concept where for example the filter parameter is changed in steps in a register of the signal processor that is being used.

As mentioned in Tietze and Schenk, page 1133, there is a growing tendency to perform the signal processing digitally rather than through analog methods. According to Tietze and Schenk, this offers the advantages of higher accuracy and reproducibility as well as a lower susceptibility to disturbances. The structure, operating principles and properties of digital filters are described in chapter 21 of the cited text. Electronic balances with digital filters are known for example from references Aikawa '342 and Tokutsu '484. Ways of realizing digital filters by means of a signal processor are described in Tietze and Schenk, chapter 21.7.2, pages 1181-1184.

Figure 2:
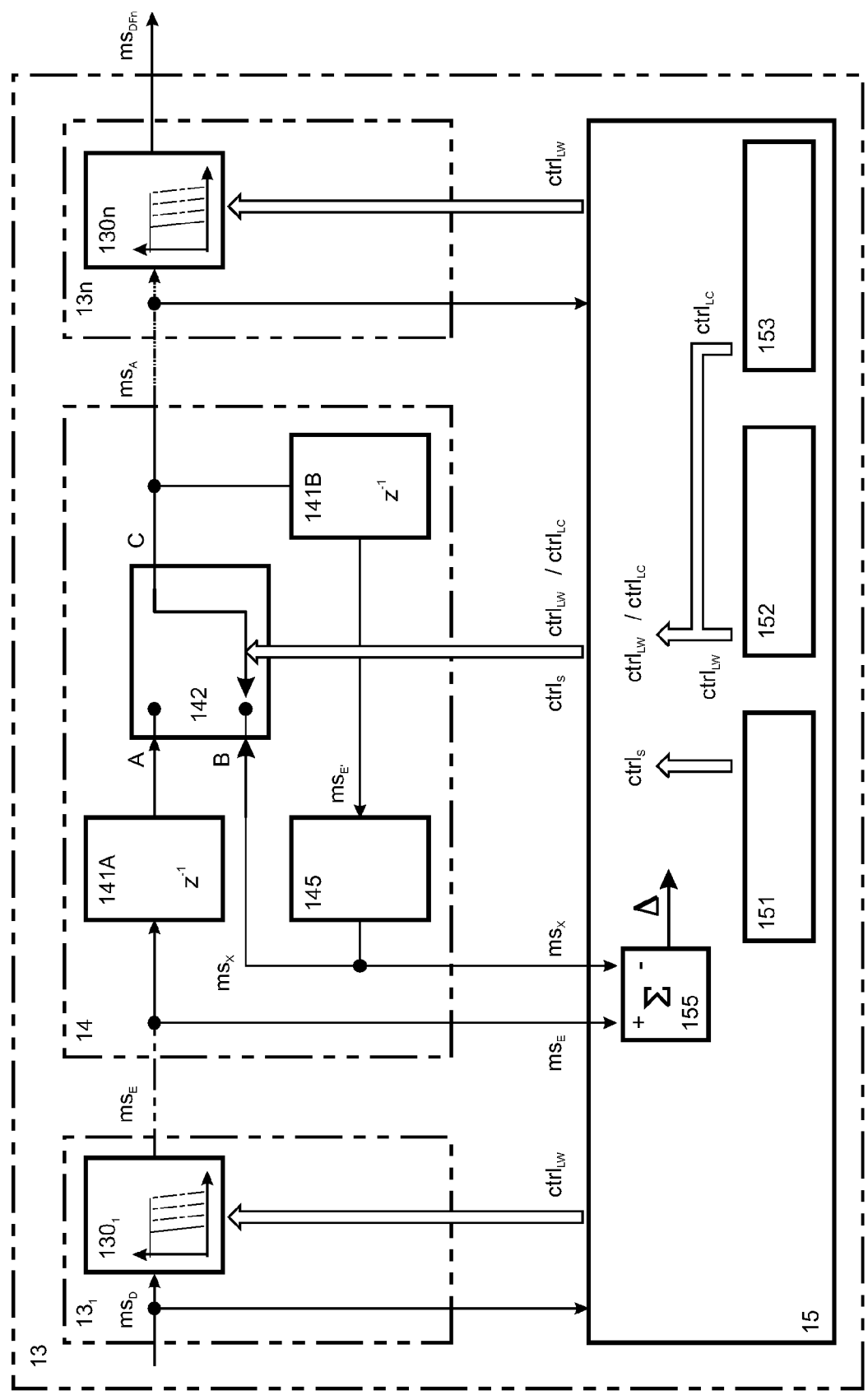
FIG. 2 shows the chain of digital filters 131, ..., 13n of FIG. 1 with a switching module 14 that is incorporated in the chain, controlled by a controller unit 15 and containing switching means whereby either the measuring signal $ms_E$ as received at the input or the output signal $ms_X$ of a measurement value unit 145 which produces a previous measurement value, a mean value or an expected value of the measurement signal $ms_E$ can be selected to pass on to the signal processing units which follow downstream in the signal path.
Figure 3:
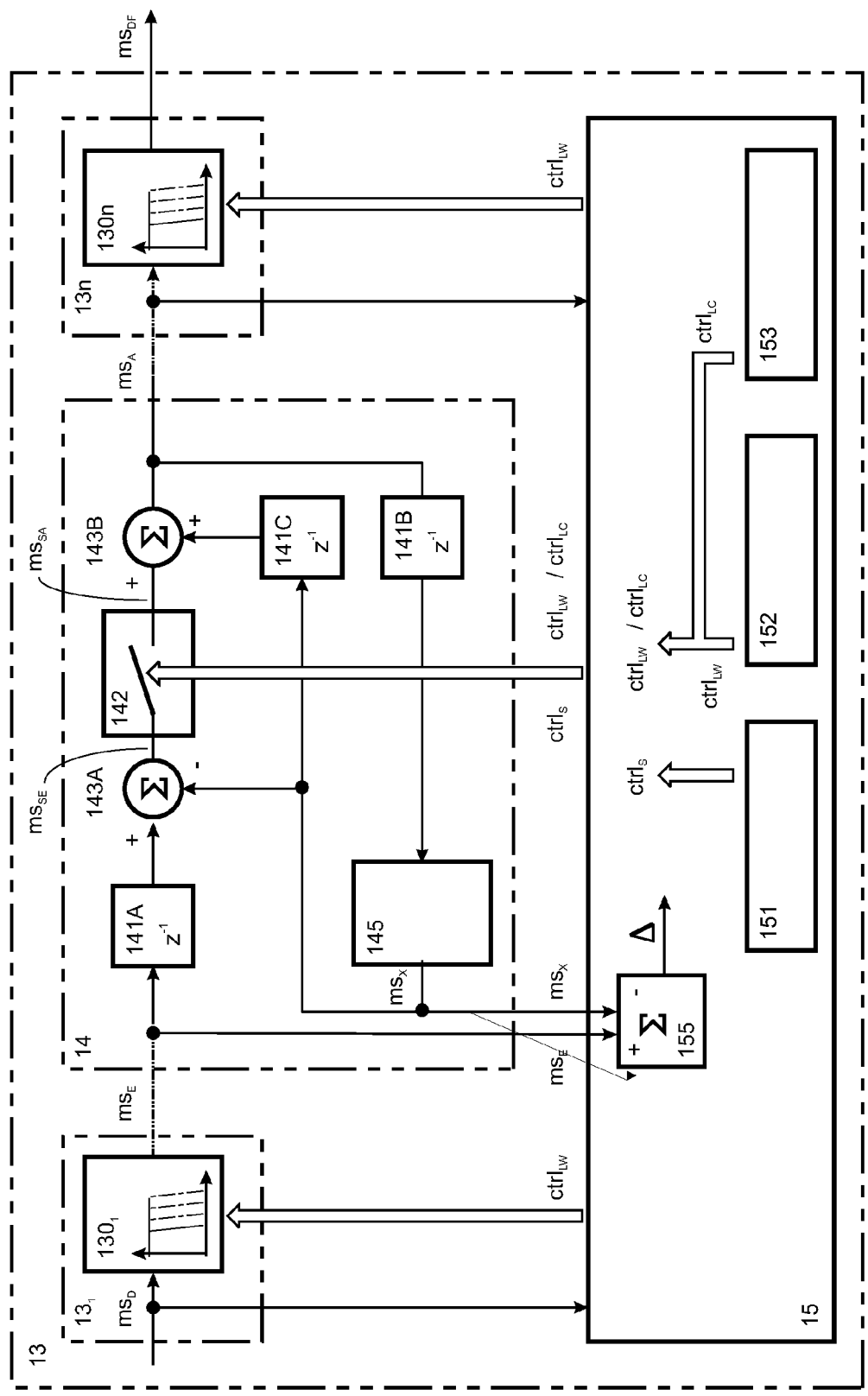
FIG. 3 is the block diagram of FIG. 2 with a first adding stage 143A, in which a difference signal is produced from the measuring signal $ms_E$ and the output signal $ms_X$ of the measurement value unit 145, delivered to the switching means 142, and subsequently in a second adding stage 143B added back to the output signal $ms_X$ of the measurement value unit 145.
Figure 4:
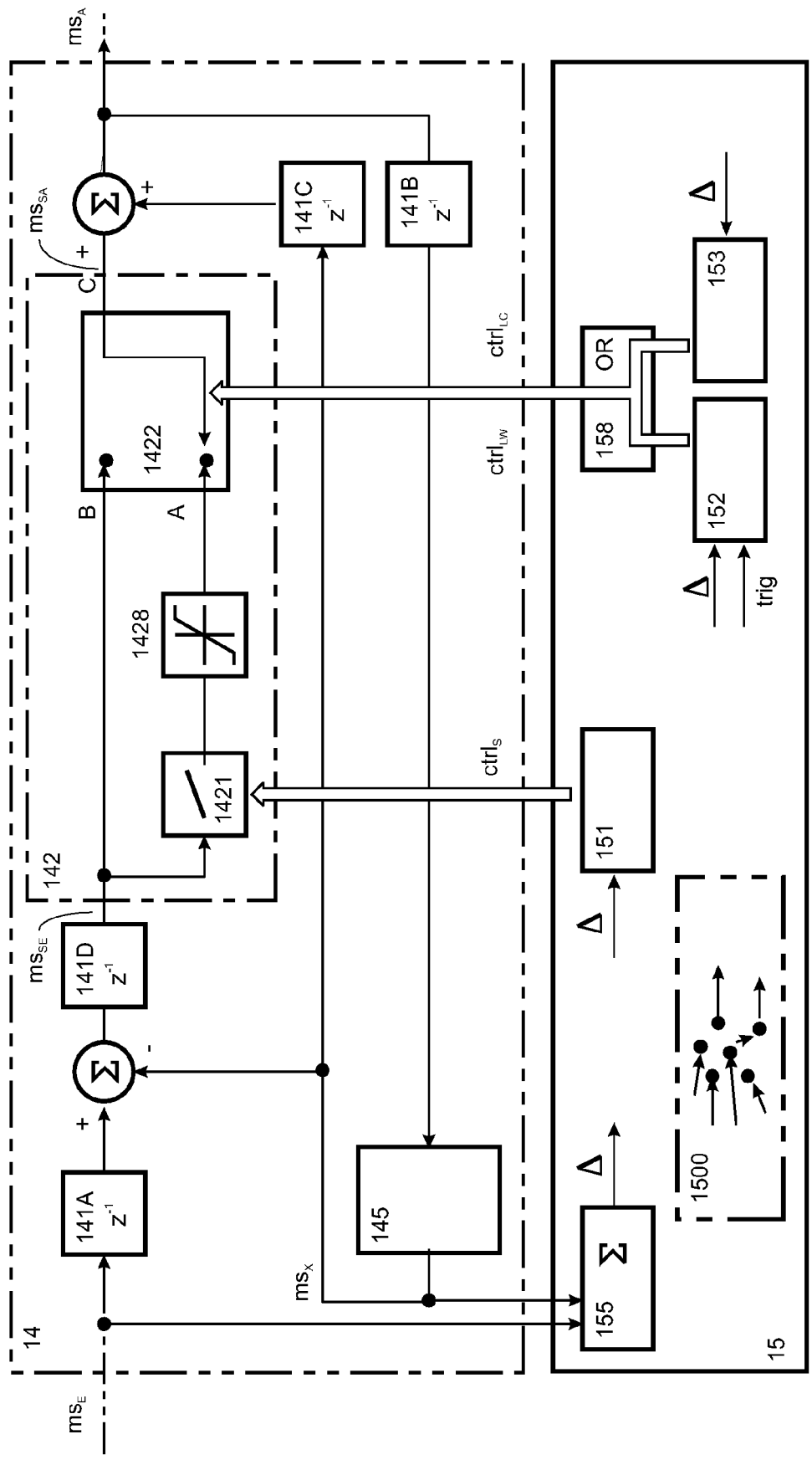
FIG. 4 shows the switching module 14 of FIG. 2 with a preferred configuration of the switching means 142 and the controller unit 15 with an advantageously usable optional neural network 1500.

If a signal processor is used, the signal processor itself essentially constitutes the digital signal-processing unit 13 including the switching module 14 which is incorporated in it (see FIGS. 2 to 4). The signal-processing modules are therefore preferably implemented as software modules.

The circuit arrangement shown in FIG. 1 with variable filters 11, 13 offers clear advantages in comparison to circuit arrangements with non-variable filters.

The two kinds of circuit arrangements, i.e. circuit arrangements with variable filters and circuit arrangements with non-variable filters, cause signal disturbances, in particular load-independent disturbances, which continue to pose significant problems. Although the filters used are already good at suppressing these disturbances, these minor or major disturbances remain a burden on the processing of the signal, because portions of these disturbances remain in the signal-processing path for a long time, in particular if recursive filters are used, and thus stand in the way of obtaining high-precision measuring results fast.

The embodiment described hereinafter serves to remove these problems in circuit arrangements with variable filters as well as in circuit arrangements with non-variable filters. As a preferred way to accomplish this, a switching module 14 is provided within or before a filter chain, as will now be described.

With the switching module 14 shown in FIG. 2, interfering signal components are shut out and replaced by the output signal $ms_X$ of a measurement value unit 145 which delivers at its output end: the value of the measuring signal $ms_E$ as received with a delay, or a mean value composed of the most recent values of the measuring signal $ms_E$ that occurred within a given time interval, or an expected value of the measuring signal $ms_E$ established on the basis of the most recent values of the measuring signal that occurred within a given time.

An expected value can be determined for example by means of a known Linear Prediction Coding ("LPC") method, i.e. a mathematical method in which the future values of the measuring signal are estimated on the basis of values of the measuring signal $ms_E$ which have already been registered.

The measuring signal $ms_E$ is monitored for the occurrence of signal disturbances by means of a first detector module 151 which is incorporated in a controller unit 15 wherein, after a signal disturbance has been detected, switching means 142 are actuated in such a way that instead of the measuring signal $ms_E$ as received, the output signal $ms_X$ of the measurement value unit 145 is transmitted to the filter stage $13_0$ which follows in the signal path.

The circuit arrangement in the embodiment of FIG. 2 is configured as follows: The measuring signal $ms_E$ received from a filter stage $13_1$ located upstream in the signal path is directed by way of a first delay element to a first input A of a changeover switch 142 and, if no disturbances have occurred, switched through for direct passage to the output C, where the signal is on the one hand passed on to the next filter stage $13_0$ and on the other hand transmitted through a second delay element 141B to the measurement value unit 145, which preferably puts out an expected value $ms_X$ for the measuring signal $ms_E$ on the one hand to the second input B of the changeover switch 142 and on the other hand to the controller unit 15.

The controller unit 15 contains an adding stage 155 which serves to form a difference signal Δ from the measuring signal $ms_E$ and the output signal $ms_X$ of the measurement value unit 145.

If the load measured by the balance 1 is constant and there are no disturbances, the difference signal Δ is equal to zero. In the presence of disturbances, step changes or gradual changes of the load signal, the difference signal Δ will deviate from zero due to the delay elements 141A and 141B. If the amount of the difference signal Δ exceeds a threshold value set in the first detection module 151, a disturbance is registered and the changeover switch 142 is switched over to the second input B, as shown in FIG. 2. Instead of the disturbed measuring signal $ms_E$, the output signal $ms_X$ of the measurement value unit 145 is transmitted to the filter unit 13 which follows in the signal path, so that the disturbance does not cause errors in the measurement values.

After the disturbance has been registered, or generally if the difference signal Δ is found to deviate from zero, this can in essence be attributed to the following status changes: If a disturbance has occurred, for example due to a mechanical shock or impact, it will decay quickly, so that the difference signal Δ returns to zero and the changeover switch 142 can be set back to the first input A.

Alternatively, there can be a permanent offset which indicates that rather than a disturbance, a change of the load has occurred. It is further possible that a step change of the load took place rather than a disturbance. In these cases, the measuring signal $ms_E$ needs to be processed again as soon as possible in the next-following filter stages $13_0$, so that the output signal of the force-measuring device 1 will follow the gradual or step change of the load immediately. It should further be emphasized that after the changeover switch 142 has been reset, the measurement value unit 145 is receiving current measuring signals $ms_E$ again, so that the output signal $ms_X$ of the measurement value unit is updated again and the difference signal Δ is thus returned to zero, which has the consequence that the first detector module 151, too, will no longer detect a disturbance.

Accordingly, the changeover switch 142 receives the control signal $ctrl_S$ of the first detector module 151 in order to cause the changeover switch 142 to switch to the second input B when a disturbance is detected. The changeover switch 142 further receives, preferably through an OR gate 158 (see FIG. 4), the control signal $ctrl_{LW}$ from the second detector module 152 which indicates a step change of the load, and the control signal $ctrl_{LC}$ from the third detector module 153 which indicates a gradual change of the load, in order to set the changeover switch 142 back to the first input A again. In this arrangement, the control signals $ctrl_{LW}$ and $ctrl_{LC}$ from the second and third detector modules 152, 153 have a higher priority than the control signal $ctrl_S$ from the first detector module 151.

Particularly important in the circuit arrangement of FIG. 2 is the first delay element 141A which imposes a delay on the incoming measuring signal $ms_E$ and sends it on to the changeover switch 142 with a time delay whose length is set so that the changeover switch 142 can be switched over in case of a disturbance before the disturbance has passed through the switch and affected the output signal of the force-measuring device 1.

It should further be noted that the changeover switch 142 is only shown in a symbolic form for the purpose of explaining the solution. In practice, the changeover switch 142 of the switching means 142 is open to arbitrary design choices. It is also considered self-evident that the solution can be implemented through hardware or software or combinations of both.

A particularly advantageous configuration of the switching module 14 is shown in FIG. 3, where the measuring signal $ms_E$ is transmitted to the output of the switching module 14 by way of the first delay element 141A, a first adding stage 143A, the switch 142, and a second adding stage 143B. In the first adding stage 143A, the output signal $ms_X$ of the measurement value unit 145 is subtracted from the measuring signal $ms_E$, so that the input of the switch 142 receives the measuring signal $ms_{SE}$ which represents the difference signal Δ and is equal to zero when the load is constant. In the second adding stage 143B, the output signal $ms_X$ of the measurement value unit 145 is added back to the arriving measuring signal $ms_{SE}$ or difference signal Δ. Consequently, when the switching means are closed, the second adding stage delivers the measuring signal $ms_E$ as received, and when the switching means are open the second adding stage delivers the output signal $ms_X$ of the measurement value unit and sends it downstream on the signal-processing path. Simply by actuating the switch 142, the output signal $ms_A$ of the second switching module 14 is thus switched between the measuring signal $ms_E$ and the output signal $ms_X$ of the measurement value unit 145.

FIG. 4 shows an advantageous embodiment of the switch or switching means 142. In this arrangement, the measuring signal $ms_{SE}$ presented at the input of the switching means 142 is directed on a first signal path with a switch 1421 and a limiter 1428 to a first output A, and on a second signal path directly to a second input B of the changeover switch 1422.

In the absence of extraneous influences such as disturbances, step changes and gradual changes of the load, the switch 1421 controlled by the first detector module 151 is closed, and the changeover switch 1422 controlled by the second and/or third detector module 152, 153 through the OR gate 158 is switched to the first input A.

When a disturbance is detected by the first detector module 151, the switch 1421 is opened by the detector module 151, and after the disturbance has settled, it is preferably not closed again until n clock cycles have elapsed. The limiter 1428 in the first signal path prevents that disturbances of a high amplitude can pass through the first signal path before the switch 1421 is actuated.

When a step change and/or a gradual change of the load is detected by the second and/or third detector module 152, 153, the detector modules cause the changeover switch 1422 to switch to the second input B and to preferably change back only after the measuring system has stabilized.

As has already been described above, after a step change of the load has been detected, the parameters of the filter units 11, 13 are preferably controlled in a way that will result in the shortest possible transient decay phase.

When a step change of the load has been detected, it is further possible that instead of the changing output signal $ms_{DF}$ of the filter chain 13, one of the following values is established and switched through to the output end of the force-measuring device 1 until the transient decay phase has ended:

the last value of the output signal $ms_{DF}$ of the filter chain 13 that was determined before the step change of the load, or a mean value of the most recent values of the output signal $ms_{DF}$ of the filter chain 13 that occurred within a given time interval, or an expected value of the output signal $ms_{DF}$ of the filter chain 13 based on the most recent values of the output signal $ms_{DF}$ that occurred within a given time interval.

Figure 5:
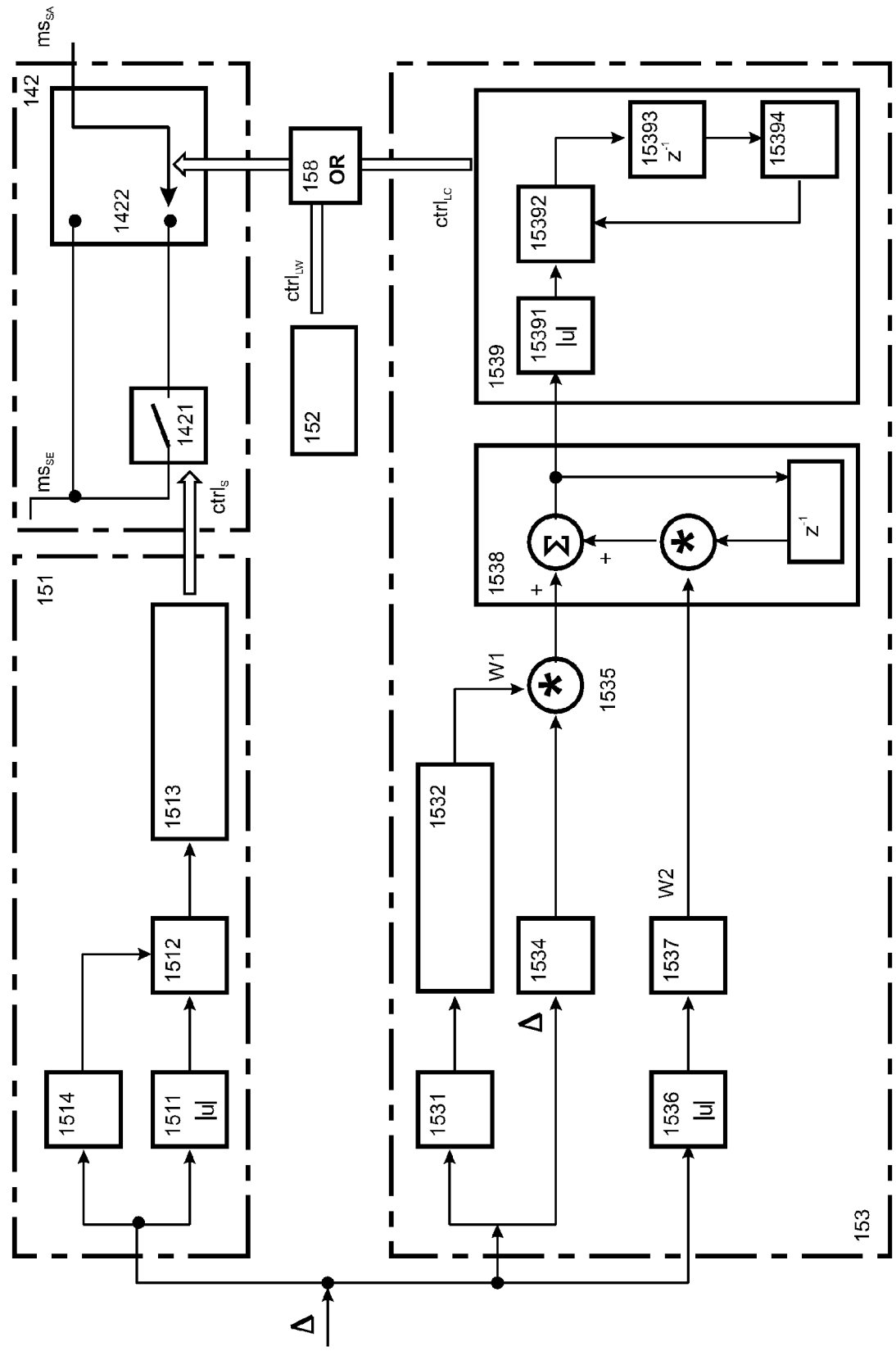
FIG. 5 shows the switching means 142 of FIG. 4, which are controlled by means of three detector modules 151, 152, 153.

FIG. 5 shows the switching means 142 of FIG. 4 which are controlled by means of the three detector modules 151, 152, 153.

The first detector module 151, which serves to detect disturbances, includes an absolute-amount module 1511, in which the absolute amount of the incoming difference signal $\Delta$ is determined and transmitted to a threshold value block 1512 following downstream in the signal path, which serves to determine whether the amount of the difference signal $\Delta$ exceeds a prescribed threshold value. As soon as the threshold value is exceeded, the switch 1421 is opened by means of a control signal $ctrl_S$ which is given out by a monitoring unit 1513. The switch is not closed again until the monitoring unit 1513 has determined that the threshold value has no longer been exceeded during n clock cycles. This procedure serves to avoid a fast and disruptive switching action of the switch 1421 which could occur if the amount of the difference signal $\Delta$ is close to the threshold value.

The illustrated preferred configuration of the first detector module 151 further includes a statistic module 1514 by means of which the variance of the difference signal $\Delta$ is measured and the level of the threshold value in the threshold value module 1512 is controlled. In the presence of a large variance, a higher threshold value is selected in order to avoid the risk of false detections of disturbances. If the variance is low, a lower threshold value is selected in order to be able to correctly detect smaller disturbances.

In the third detector module 153, the difference signal $\Delta$ is introduced either directly or through a limiter 1534 into an integrator 1538 whose output signal is compared with regard to its absolute amount (which is determined in the module 15391) to at least one threshold value in a threshold value block 1539. Exceeding this threshold value indicates that a load change has occurred. After a load change has been detected, the return into the range below this first or below a second, lower threshold indicates that the measuring system has followed the load change. The switchover between the two threshold values occurs by means of a delay element 15393 arranged downstream of the threshold value module 15392 and by means of a switchover module 15394 which, after the threshold value has been exceeded, sets the latter to its lower level and restores it to its higher value only after the signal has also fallen below the lower value.

In order to allow small gradual load changes to be detected quickly, the zero-crossing of the difference signal $\Delta$ which occurs in this case is detected in the third detector module 153 by means of a module 1531. With each zero-crossing, the module 1531 triggers a connected counter 1532 which generates a count value dependent on the zero-crossing. This count value z, preferably raised to some power (z, $z^2$ or $z^3$) is used as a first weighting factor W1 by means of which the difference signal $\Delta$ is weighted in a multiplier module 1535 before it is passed on to the integrator 1538. Through this weighting, a very small and constant offset, or a very slight rise of the difference signal $\Delta$ rapidly produces an equally significant effect as a much larger offset.

A second weighting factor W2 is used for the control of the integrator 1538. This second weighting factor W2 is formed by comparing the difference signal $\Delta$ with regard to its absolute amount (which is provided by the module 1536) to at least one threshold value in a third detector module 153 in order to form a second weighting factor W2 which is delivered to a multiplier module inside the integrator 1538 or inside the integrator loop, in order to cause a stepwise increase of the signal currently in process, if the difference signal $\Delta$ is about zero. Thus, the integrator 1538 ramps up rapidly for larger as well as for very small load changes and rapidly comes back down after the load changes have settled in (difference signal $\Delta \rightarrow 0$).

The method and the force-measuring device 1 have been described and illustrated through preferred embodiments. The force-measuring device has been described as embodied in a balance 1. However, the invention can also be applied to other force-measuring devices such as gravimetric measuring instruments, weighing modules, load cells and force sensors which in some cases may constitute part of a balance.

As has further been shown, the inventive concept can be realized in combination with a diversity of technologies such as analog circuit technology or digital technology or as a software solution in conjunction with a signal processor.

Furthermore, as a matter of course, the invention is not limited to the filters and switching means presented herein.

What is claimed is:

1. A method for processing an output signal of a measurement transducer incorporated in a force-measuring device, comprising the steps of:

producing, in the measurement transducer, a measuring signal representing a load acting on the transducer;

filtering the measuring signal to suppress interfering signal portions caused by extraneous influences;

directing the filtered measuring signal to a first delay element that imposes a time delay thereon, resulting in a delayed, but otherwise undisturbed, filtered measuring signal that is delivered to a switching means, where the imposed time delay exceeds the time required to switch a changeover switch of the switching means;

directing the filtered measuring signal to a measurement value unit, which delivers an output signal at an output thereof, the output signal selected from one of:

a received and retained value of the measuring signal;

a mean value based upon the most recent values of the measuring signal that occurred within a given time interval; and an expected value of the measuring signal based upon the most recent values of the measuring signal that occurred within a given time;

monitoring the measuring signal in a first detector module incorporated in a controller unit to detect signal disturbances, and actuating the switching means when a signal disturbance is detected, to interrupt the delivery of the filtered measuring signal to the measurement value unit and to send the output signal of the measurement value unit to the downstream-connected modules of the force-measuring device, instead of the delayed measuring signal.

2. The method of claim 1, wherein:

the delivery of the output signal at the output of the measurement value unit is delayed, due to at least one of:

sending the measuring signal to the measurement value unit through the first delay element, delivering the output signal of the measurement value unit by way of the first delay element, and realizing a delay within the measurement value unit.

3. The method of claim 2, wherein the directing step occurs by way of the first delay element and a first adding stage, where the output signal ($ms_X$) is subtracted from the measuring signal ($ms_E$), and further by way of the switching means, to a second adding stage, where the output signal ($ms_X$) is added back to the arriving signal such that:

when the switching means is closed, the second adding stage delivers the measuring signal ($ms_A=ms_E-ms_X+ms_X$) as received, and when the switching means is open, the second adding stage delivers the output signal ($ms_A=0+ms_X$) and sends it to the output of the force-measuring device.

4. The method of claim 3, wherein:

the monitoring step for the occurrence of step changes of the load is achieved in a second detector module which is incorporated in a controller unit; and the monitoring step for the occurrence of gradual changes of the load is achieved in the second detector module or in a third detector module which is incorporated in a controller unit, and the switching means actuating step occurs when step changes or gradual changes of the load are detected, causing the measuring signal ($ms_E$) to pass through the switching means directly to an output connection thereof ($ms_A=ms_E$).

5. The method of claim 4, comprising the further steps of:

directing both the measuring signal ($ms_E$) and the output signal ($ms_X$), which has a time delay in relation to the measuring signal ($ms_E$) by passage through at least one of the first delay element and a second delay element, inside the controller unit to an adding stage that produces a difference signal therefrom, and processing the difference signal by at least one of the following steps:

comparing the absolute value of the difference signal to a fixed or variable threshold value in a first threshold value module inside the first detector module, in order to detect disturbances;

comparing the absolute value of the difference signal to a fixed or variable threshold value in the second detector module, in order to detect step changes of the load; and introducing the difference signal, either directly or by way of a limiter, into an integrator in the third detector module, and comparing an absolute value of the integrator output signal to at least one threshold value in a threshold value block, wherein an upward crossing of the threshold level indicates that a gradual load change has occurred and the subsequent downward crossing of the threshold level indicates that the load change has settled.

6. The method of claim 5, wherein at least one of the following occur:

the first detector module contains a statistic module that calculates the variance of the difference signal is calculated and the threshold value in the first threshold value module is set at a level depending on the variance; and in the third detector module, a module detects a zero-crossing of the difference signal, and, in a downstream-connected counter stage, a zero-crossing generates a count value as a function thereof, which count value is preferably raised to a higher power to form a first weighting factor by which the difference signal is weighted in a multiplier stage before being introduced into the integrator; and in the third detector module, a threshold value module compares the absolute value of the difference signal to at least one threshold value, establishing a second weighting factor, which is used to control the integrator in order to reset the output signal of the integrator if the difference signal is substantially equal to zero; and a downstream-connected threshold value module compares the output signal of the integrator to at least one higher first threshold value in order to detect a gradual change of the load, and the integrator output signal is then compared to a lower second threshold value in order to establish that the force-measuring device has followed the load change.

7. The method of claim 6, further comprising the step of:

introducing at least one of the measuring signal and the difference signal into a trained neural network which, when a signal change occurs, determines whether the signal change was caused by at least one of: a mechanical disturbance, by a step change and by a gradual change of the load, whereupon at least one of: the filter parameters and the switching means are steered accordingly.

8. The method of claim 4, wherein a measuring signal ($ms_{SE}$) presented at the input of the switching means is directed either to a first input of a changeover switch through a first signal path that is equipped with a switch and a limiter, or directly to a second input of the changeover switch on a second signal path, wherein the directing occurs as follows:

in the absence of extraneous influences such as disturbances, step changes or gradual changes of the load, the switch on the first signal path, controlled by the first detector module, remains closed and the changeover switch, controlled by at least one of: the second and third detector module, remains switched to the first input;

when the first detector module detected a disturbance, the first detector module opens the switch and preferably does not close it again until n clock cycles have elapsed after the disturbance has settled down;

when the second or third detector module detects a step change or a gradual change of the load, the respective detector module causes the changeover switch to connect to the second input and preferably does not cause it to switch back to the first input until after the measuring system has stabilized.

9. The method of claim 1, wherein at least one of the following occur:

the step of filtering the measuring signal ($ms_E$) occurs in an appropriate digital or analog filter stage before being introduced into the switching means; and the measuring signal ($ms_{SA}$) delivered by the switching means is filtered in an appropriate digital or analog filter stage before being directed to the output of the force-measuring device.

10. A device for measuring a force, comprising:

a measurement transducer producing a measuring signal representative of a load acting on the force-measuring device, the measuring signal being filterable in an analog or a digital filter to suppress interfering signal portions caused by extraneous influences;

a first delay element into which the measuring signal is introduced to impose a time delay thereon, producing a delayed but otherwise undisturbed measuring signal;

a measurement value unit into which the measuring signal is introduced, the measurement value unit producing at an output thereof at least one of:
  a received and retained value of the measuring signal,
  a mean value composed of the most recent values of the measuring signal that occurred within a given time interval, and
  an expected value of the measuring signal established on the basis of the most recent values of the measuring signal that occurred within a given time;
a controller unit;
a first detector module, incorporated in the controller unit, for monitoring the measuring signal with regard to the occurrence of signal disturbances; and
a means for switching, having a switchover time that is exceeded by the delay imposed by the first delay element, actuatable upon the first detector module detecting a signal disturbance, such that the delivery of the measuring signal to the measurement value unit is interrupted and the output signal of the measurement value unit is sent to the downstream-connected modules of the force-measuring device instead of the received delayed measuring signal.

11. The force-measuring device of claim 10, wherein:
the first delay element is arranged such that at least one of the following occur:
  the measuring signal is transmitted to the measurement value unit through the first delay element;
  the output signal of the measurement value unit is delivered by way of the first delay element, and
  a delayed delivery of the output signal is realized within the measurement value unit.

12. The force-measuring device of claim 11, further comprising:
a first adding stage, where the output signal ($ms_X$) of the measurement value unit is subtracted from the measuring signal ($ms_E$); and
a second adding stage, where the output signal ($ms_X$) of the measurement value unit is added back to the signal arriving thereat;
wherein the measuring signal ($ms_E$) is directed through the first delay element, the first adding stage, and, by way of the switching means, to the second adding stage, so that, when the switching means is closed, the second adding stage delivers the measuring signal ($ms_A = ms_E - ms_X + ms_X$) as received, and, when the switching means is open, the second adding stage delivers the output signal ($ms_A = 0 = ms_X$) of the measurement value unit and sends it to the output of the force-measuring device.

13. The force-measuring device of claim 10, further comprising:
a second detector module, incorporated in the controller unit, for monitoring the measuring signal ($ms_E$) for the occurrence of step changes of the load, and
a third detector module, also incorporated in the controller unit, for monitoring the measuring signal ($ms_E$) for gradual changes of the load;
such that if step changes or gradual changes of the load are detected, the switching means is actuated to pass the measuring signal ($ms_E$) through the switching means directly to an output connection thereof ($ms_A = ms_E$).

14. The force-measuring device of claim 13, further comprising:
an adder stage, inside the controller unit;
a first threshold value module inside the first detector module; and
a threshold value block, comprising a limiter and an integrator;
such that the measuring signal ($ms_E$) and the output signal ($ms_X$) of the measurement value unit, the latter signal ($ms_X$) having a time delay relative to the measuring signal ($ms_E$) produced by the first delay element, are both directed to the adding stage which generates a difference signal ($\Delta$) from the signals ($ms_E$, $ms_X$), with at least one of the following operations occurring to the difference signal ($\Delta$):
  comparing its absolute value to a fixed or variable threshold value in the first threshold value module to detect disturbances;
  comparing its absolute value to a fixed or variable threshold value in the second detector module to detect step changes of the load; and
  introducing it in the third detector module, either directly or by way of the limiter, into an integrator, with the absolute value of the integrator's output signal compared to at least one threshold value in the threshold value block, wherein an upward crossing of the threshold level indicates that a gradual load change has occurred and the subsequent downward crossing of the threshold level indicates that the load change has settled.

15. The force-measuring device of claim 14, further comprising:
a statistic module in the first detector module, by which a variance of the difference signal ($\Delta$) is calculated and the threshold value in the first threshold value module can be set at a level depending on the variance;
a module in the third detector module for detecting a zero-crossing of the difference signal ($\Delta$), such that a count value is generated in a downstream-connected counter stage as a function of the zero-crossing, the count value being raised to a higher power to form a first weighting factor (W1) by which the difference signal ($\Delta$) is weighted in a multiplier stage before being introduced into the integrator;
a threshold value module in the third detector module, where the absolute value of the difference signal ($\Delta$) is compared to at least one threshold value, establishing a second weighting factor (W2) which is used to control the integrator by resetting the output signal thereof if the difference signal ($\Delta$) is substantially equal to zero; and
a downstream-connected threshold value module for comparing the integrator output signal to at least one higher first threshold value, to detect a gradual change of the load, after which the integrator output signal is compared to a lower second threshold value to establish that the force-measuring device has followed the load change.

16. The force-measuring device of claim 15, further comprising:
a trained neural network, into which at least one of the measuring signal ($ms_E$) and the difference signal ($\Delta$) are introduced, such that the trained neural network determines, when a signal change occurs, whether the signal change was caused by at least one of: a mechanical disturbance, by a step change and by a gradual change of the load, whereupon at least one of: the filter parameters and the switching means are steered accordingly.

17. The force-measuring device of claim 13, further comprising:
a changeover switch having first and second inputs, the first input on a first signal path that is equipped with a switch and a limiter and the second input on a second signal path, such that the measuring signal ($ms_{SE}$) presented at the input of the switching means can be directed to either input, wherein at least one of the following occurs:

in the absence of extraneous influences such as disturbances, step changes or gradual changes of the load, the switch, which is controllable by the first detector module, remains closed and the changeover switch, which is controllable by at least one of the second and third detector modules, remains switched to the first input;

when the first detector module detects a disturbance, the first detector module opens the switch and cannot close it again until n clock cycles have elapsed after the disturbance has settled down;

when at least one of the second and third detector modules detects either a step change or a gradual change of the load, that detector module causes the changeover switch to connect to the second input and cannot cause it to switch back to the first input until after the measuring system has stabilized.

18. The force-measuring device of claim 10, further comprising:

filter stages, of an appropriate digital or analog nature, arranged in the signal path upstream or downstream of the switching means.

* * * * *